LINE CIRCUIT USING TRANSISTORS
Filed March 16, 1955
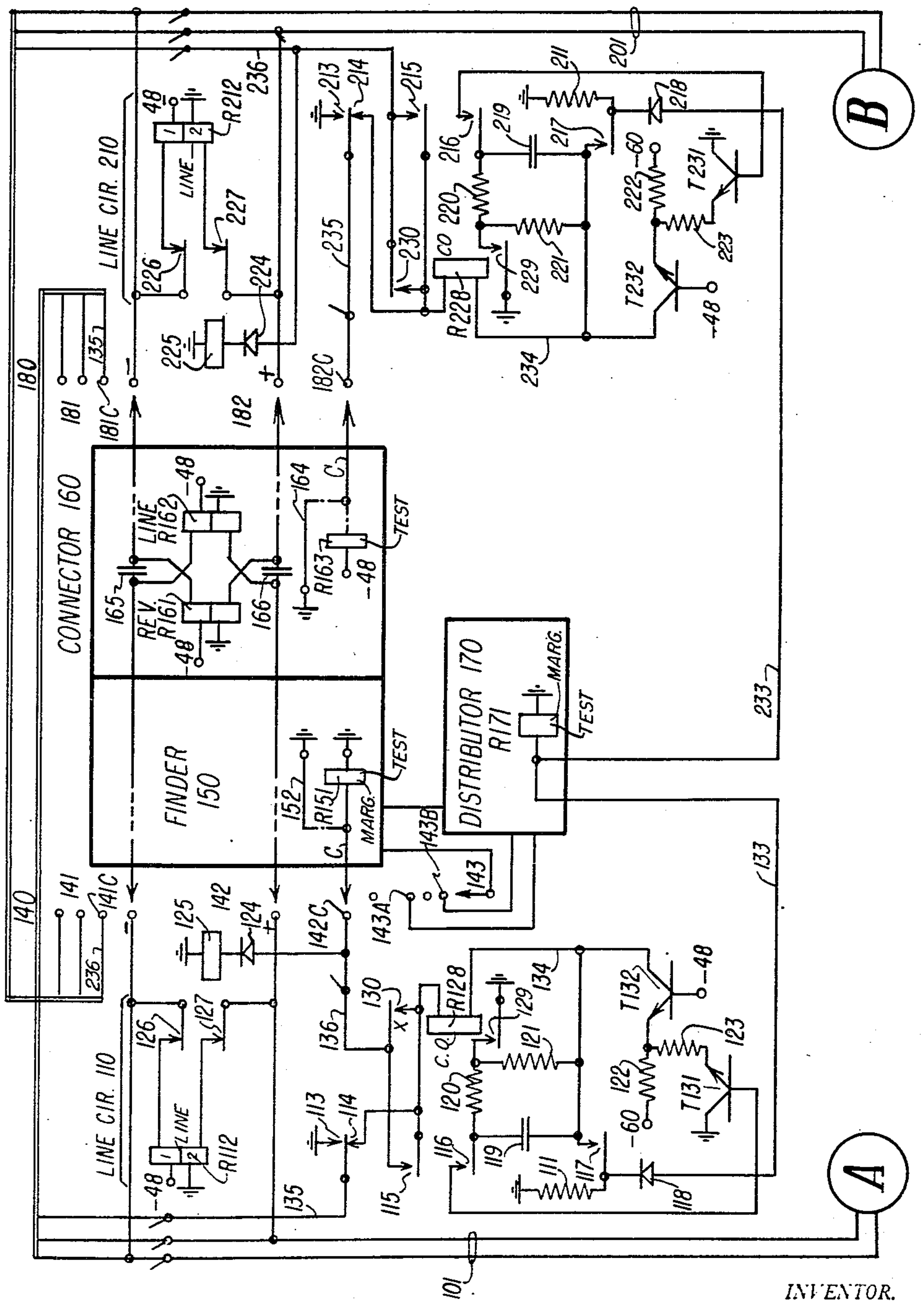
INVENTOR.
Alfred H. Faulkner
BY Smith, Olsen, Baird and Gulbrandsen
Attys.

2,785,229

LINE CIRCUIT USING TRANSISTORS

Alfred H. Faulkner, Chicago, Ill., assignor to Automatic Electric Laboratories, Inc., Chicago, Ill., a corporation of Delaware Application March 16, 1955, Serial No. 494,637

13 Claims. (Cl. 179—18)

This invention relates to automatic telephone systems and particularly to electronically controlled line circuits for such systems.

The development of small compact current control devices and particularly the development of such devices having low power requirements has provided new means for performing switching functions which appear to be particularly well adapted for use in automatic telephone systems. Specifically, new developments in the transistor field have provided current flow devices having characteristics which may be utilized in automatic telephone switching to effect more efficient and less expensive telephone service.

It is an object of this invention to provide an improved line circuit in which switching functions are accomplished through the use of semiconductor devices.

Another object of the invention is to provide an improved line circuit utilizing transistors and asymmetrically conducting diodes to perform switching operations.

Another object of the invention is to provide an improved line circuit utilizing a diode to register the completion of a call.

A further object of the invention is to provide an improved line circuit adapted for lock-out service utilizing transistors and diodes to perform switching operations.

Further features of the invention pertain to the particular arrangement of the circuit elements in the telephone system and the line circuit whereby the above outlined operating features are attained.

The invention, both as to its organization and method of operation, together with further objects and advantages thereof, will be best understood by reference to the following specification and the accompanying drawing, forming a part thereof, wherein:

The single figure illustrates the details of an automatic telephone system including a line circuit adapted to provide lock-out service and using transistors and poled diodes in accordance with the invention.

Referring specifically to the drawing, there is illustrated an automatic telephone system comprising an exchange serving a number of subscriber lines including the subscriber line 101 extending to the subscriber station A and a subscriber line 201 extending to subscriber station B. The respective lines may be private or party lines wherein the stations thereof are comprised of conventional station apparatus adapted to be rung by harmonic or code means. Each of the lines 101 and 201 is provided with a line circuit 110 and 210 respectively individual thereto and identical in circuit construction.

In addition, the system comprises a distributor 170 of a conventional type operatively associated with the line circuits 110 and 210 as well as with a plurality of finder-connector link circuits. One of the links is illustrated and comprises the finder 150 and the connector 160 shown in box schematic form and which may be of any suitable type, although preferably of the Strowger type. Thus, as shown, the finder 150 includes Strowger mechanism 140 comprising line and control wipers and a contact set bank.

The contact set bank includes a plurality of contact sets arranged in vertical levels and in horizontal rows in each level and the contact sets are adapted to individually receive the wipers. Two contact sets 141 and 142 are illustrated. Each contact set is connected to an individual subscriber line and the respective line circuit and includes a negative line contact, a positive line contact and a control contact. In addition the finder 150 includes a vertical level control mechanism 143 having a wiper particularly connected to the finder 150 and vertically arranged contacts equal in number to the levels in the contact bank, each vertical contact of which is associated with the line circuits common to the contact sets in one level of the contact bank.

The line finder 150 further includes a test relay R151 of the marginal type wherein a winding thereof is connected between the control wiper and ground potential. Upon being operated by the distributor the wipers of the line finder search through the contact sets of the contact bank for a control contact marked at the negative battery potential (—48 volts) which indicates that the line associated with the contact set is calling. The test relay R151 operates upon seizure of the calling line by the line finder and causes a holding potential from ground to be applied via conductor 152 and the control wiper to the line circuit of the calling line. The holding ground potential is retained on the line circuit during the period of the call.

The connector 160 includes Strowger mechanism 180 which is substantially identical to Strowger mechanism 140 having line and control wipers and a bank of contact sets. Contact sets 181 and 182 are illustrated. Additionally the connector includes the reverse battery relay R161 and the line relay R162 and the test relay R163. When the calling line is seized by the finder-connector link the line relay R162 operates to prepare the connector for completing the call to the called line and when the called party answers the reverse battery relay operates to reverse the polarity of the calling line in order to facilitate control functions at the calling terminal in a manner well known in the art. The test relay R163 includes a winding connected between the control wiper and battery potential (here shown as —48 volts) which tests the called line for idle or busy condition. When the called line is idle battery potential is returned to the winding thereby preventing the relay from operating and causing a holding potential from ground to be returned to the called line via the conductor 164 and the control wiper. When the called line is busy ground potential is returned to the winding causing the test relay to operate, whereby a busy signal is returned to the calling line. Also the connector 160 may be adapted to release its connection to a calling subscriber line if dialing does not take place after a given time whereby the link circuit is made available to another line for the completion of a call.

The distributor 170 includes a test relay R171 of the marginally operated type which is connected between ground potential and the start conductors extending to the line circuits 110 and 210. The relay R171 is operated in response to the negative battery potential being applied thereto over a start conductor 133 to cause a link to search for a calling line in a manner well understood in the telephone art.

In the telephone system, and by the way of illustration, each subscriber station is designated by a two digit directory number individual thereto. The first digit indicates the vertical bank level and the second digit indicates the contact set in the bank level of the connector contact bank terminating the designated subscriber line.

The mode of operation of the apparatus incorporated in the telephone system will be better understood from the following description of calls made between the subscriber stations through apparatus including th individually associated line circuits.

An understanding of the general operation of the telephone system in accordance with the invention may be had by tracing a call initiated at subscriber station A and directed to the subscriber station B. When the receiver at station A is removed from the hook the associated line circuit 110, the detailed operation of which will be explained hereinafter, is controlled to mark the control contact 142C in contact set 142 and the level contact 143A in mechanism 143 as calling and to cause distributor 170 to assign an idle finder connector link, such as that illustrated comprising the finder 150 and the connector 160, to find the calling line. When the finder finds the calling subscriber line 101 the line circuit 110 is further controlled in order to mark the subscriber line 101 as busy at control contact 181C in contact set 181 to the connector 160 and other connectors having access thereto and to dismiss the distributor 170. Thereafter the connector 160 responds to the directory number dialed at subscriber station A and moves the wipers thereof to the contact set 182 of the subscriber line 201 designated by the called directory number. The connector 160 completes the connection to the subscriber line 201 and the line circuit 210 associated therewith. When the line 201 is found to be busy a busy signal is returned over the calling line 101 to station A. In the event that the line 201 is found to be idle the connector rings the party at station B and controls the line circuit 210 so as to mark the line 201 as busy at the control contact 141C in the contact set 141 to the finders 150 etc.

Further, the line circuits 110 and 210 are adapted in accordance with the invention to provide in cooperation with the link circuits a lock-out service for the respective lines with which they are individually associated. Thus if the line initiating a call fails to dial a directory number within a given time interval after the link circuit has been connected or if the calling party fails to hang up within a given time interval after the called party has hung up or if the party at the calling line hangs up but the party at the called line does not hang up the link circuit will be released from the respective lines and line circuits. The line circuit associated with the individual line responds to the release of the link circuit by locking the closed line out of service so as to prevent the line from being connected to another link circuit until the party on the closed line has hung up. By way of example, if the party at station B answers a call from a party at station A and at the end of the conversation hangs up first the link circuit will release itself at the end of a timer period in the event that the party at the station A has not hung up, thereupon the line circuit 110 will automatically busy itself so as to prevent the line from being connected to another link circuit either for initiating or receiving a call until the party at station A hangs up.

With specific reference to the line circuit, the line circuits 110 and 210 shown are identical therefore any explanation made with reference to one line circuit is understood to apply also to the other. Each line circuit is connected to its respective subscriber line at the positive and negative line conductors through which connections the line circuit is controlled responsive to the initiation of a call. Further, each line circuit provides a finder control conductor which indicates when the line is calling and a connector control conductor which indicates whether the line is idle or busy. A source of power having three terminals operates the line circuit and the three terminals are respectively the reference voltage (ground potential), the low voltage (—48 volts) and the high voltage (—60 volts). The operating principles and other features of the line circuit will be understood from the following operational study of the circuit in a telephone system.

Considering first the condition when subscriber line 101 is idle, or open, in the line circuit 110 the transistor T132 is biased conductive by the —48 volts connected to the base electrode and the —60 volts connected to the emitter electrode through resistor 122. The collector electrode of the transistor T132 is maintained at —48 volts and is connected by a bus line 134 to one terminal of the winding of relay R128, the other terminal of the winding being connected to the control contact 181C of the contact set 181 in the connector bank 180 through the contacts 114 and the connector control conductor 135. The transistor T131 is nonconductive at this time and relays R112 and R128 are not operated.

When the subscriber at station A initiates a call a loop circuit is completed from low potential (—48 volts) through the upper winding of the relay R112, the contacts 126, the negative conductor of line 101, the station A, the positive connector of line 101, the contacts 127 and the lower winding of R112 to the reference potential (ground). The relay R112 is operated and the contacts 114 opened and the contacts 113 closed thereby marking the control conductor 135 with the reference potential to indicate that the line 101 is busy. Further the contacts 115 and 117 are closed thereby applying the collector potential of the transistor T132 (—48 volts) via the bus 134 and the winding of relay R128 to the finder control conductor 136 and via the bus 134 and the diode 118 to the start conductor 133.

The negative voltage on conductor 133 is extended to the distributor 170 wherein the relay R171 is operated thereby marking the vertical level contact 143A, in vertical level mechanism 143 and selecting the idle finder 150 to find and seize the calling line. The finder 150 searches first to find the vertical level to which the line 101 is connected in the line finder contact bank by searching over the level contacts in the vertical level mechanism 143. As the contact 143A therein is marked the line finder stops at that vertical level and searches through the contact sets in the marked level to find a control terminal marked with the negative voltage. In this case control contact 142C is marked negative and the finder 150 connects to the contact set 142.

When the finder 150 seizes the subscriber line 101 the low potential on the control conductor 136 operates the test relay R151 causing the reference potential to be returned to the control conductor 136 as a holding potential. The holding potential operates the cut-off relay R128 which first closes contacts 130 thereby providing a holding circuit from control conductor 136 to the winding of relay R128 and opens contacts 126 and 127 thereby interrupting the circuit through the windings of relay R112. The line relay R112 restores and opens the contacts 113, 115 and 117 and closes the contacts 114. The holding ground potential on the control conductor 136 is extended to the control conductor 135 at closed contacts 114 thereby marking the line as busy to the connectors 160 etc. having access thereto and the low potential on the bus 134 is removed from the start conductor 133 at open contacts 117. Additionally, upon operation of the relay R128 the contacts 129 are closed thereby completing a connection via the resistor 120 and the capacitor 119 and the shunt resistor 121 to the bus 134 whereby the capacitor 119 is charged. The seizure of the line 101 causes a circuit to be completed through the line relay R162 in the connector 160 causing the relay R162 to operate and to prepare the connector for completing the call.

At this time the link circuit including the finder 150 and connector 160 has been connected with the calling subscriber line 101 and the distributor 170 has been released from the circuit. The connector is now in a condition to receive the dialing pulses corresponding to the directory numbers of the called station.

In response to the dialing of the numbers designating the station B, the connector 160 completes a connection to the contact set 182. When the line 201 is busy the connector control conductor 235 in the line circuit 210 is marked by the holding ground potential applied thereto by the busying line finder as described with reference to the line finder 110. The test relay R163 in the connector 160 is operated causing a busy tone to be returned to the calling line 101 in a manner well understood in the art. The established connection between the line circuit 110, the link circuit and the line circuit 210 is interrupted when the calling party thereafter returns his receiver to the hook.

Assuming that subscriber line 201 is idle, the control conductor 235 is marked by the low potential whereupon the relay R163 in the connector is not operated and the holding ground potential is applied over conductor 164 to the control conductor 235 at the contact 182C. Thereafter the relay R228 is operated over a path extending from conductor 235 through contacts 214, the winding of the relay R228 and the bus 234 to the collector of the transistor T232. The operation of the relay R228 closes contacts 230 whereby the holding ground potential is extended to the finder control conductor 236 to mark the line as busy to finder 150 etc. and contacts 226 and 227 are opened thereby preventing the operation of relay R212. At this time the line 201 has been seized, the line circuit 210 operated to mark the line as busy to the finders and the connector prepared to ring the station on the called line.

Thereafter the subscriber station B is rung and assuming that the party at station B does not answer the link circuit may be released by the calling party at station A replacing his receiver on the hook thereby opening the loop extending to line 201 and station B. In particular when the party at substation A opens the loop the relay R162 in connector 160 is restored and the connections from the link circuit to the line circuits are knocked down whereby the holding grounds are removed from the line circuits. In the line circuits 110 and 210 the relays R128 and R228 are respectively restored thereby closing the contacts 126 and 127 and the contacts 226 and 227, respectively so as to prepare them for initiating or receiving calls.

Assuming that the party at station B answers, the reverse battery relay R161 is operated and a talking connection completed between the lines 101 and 201 through the capacitors 165 and 166. Assuming that the party at the called station B hangs up first the talking connection is interrupted but all of the line circuit connections are released only when the party at station A replaces his receiver on the hook thereby restoring the relay R162 in the connector.

Assuming that the call has been completed from subscriber station A to subscriber station B and the subscriber at station A hangs up first the link circuit is released and the line circuit 110 restored to its idle condition and prepared to initiate and receive calls. In line circuit 210 the holding ground potential extending thereto by connector 160 is removed with the release of the link circuit thereby restoring relay R228. Upon restoration of relay R228 contacts 226 and 227 are closed whereby a circuit is completed through the windings of relay R212 and the relay R212 operates. Thereupon contacts 216 are closed and the potential on the charged capacitor is extended to the base of the transistor T231 and the transistor is triggered conductive. The current flow from the emitter electrode of T231 through the resistors 223 and 222 to the high voltage terminal (−60 volts) biases the emitter electrode of the transistor T232 nonconductive. The capacitor 219 is quickly discharged through the resistors 220 and 221, through the closed contacts 217 and the resistor 211 to the reference voltage terminal. The reference potential is also applied through the resistor 211, the bus 234, the winding of the relay R228 and the closed contacts 215 to the finder control conductor 236 whereby the line 201 is indicated as busy to the finders. Further, the reference potential is applied at the closed contacts 213 to the control conductor 235 to indicate the line as busy to the connectors. At this time the line 201 is locked-out of service permitting neither the initiating or receiving of calls thereto until the party at station B replaces his receiver on the hook. When the receiver is returned to the hook the relay R212 is restored and the contacts 216 are opened thereby rendering the transistor T231 nonconductive and the transistor T232 conductive. The line 201 is now idle and prepared to initiate or receive calls.

It is understood that the line circuit will be locked-out of service in the manner described above any time that the holding ground furnished by the link is removed from the line circuit in which a circuit is completed through the associated line conductors either by the conductors being interconnected in the subscriber station thereon or by the conductors being shorted together in some other manner.

Each of the line circuits 110 and 210 also include a call counter circuit which makes a record of an initiated call at the calling line circuit at the time when the call is completed. In the line circuit 110 the call counter comprises the diode 124 and the meter apparatus 125 which are connected in series between the finder control conductor 136 and the reference voltage terminal of the power source. In the line circuit 210, the counter circuit comprises the diode 224 and the meter apparatus 225 which are connected in series between the finder control conductor 236 and the reference voltage terminal. As mentioned above these circuits are operated only when the line associated with the respective line circuits is the call initiating line and that call is completed, at which time the connector 160 causes a voltage pulse which is poled positive with respect to the reference potential to be returned to the finder control conductor 136 by means of the control wiper of the line finder 150. The positive voltage pulse causes the diode in the counter circuit to conduct thereby operating the associated meter and making a record that the call initiated at that line was completed.

It is clear from the foregoing description and from the drawings that *n—p—n* semiconductor junction type transistors are preferred for use in the line circuit though it is understood that *p—n—p* type transistors may also be used. Under the latter circumstances the potentials illustrated as being connected to the various circuit elements would necessarily have to be changed. In any event it is clear that the above described embodiment is merely illustrative of the principles of the invention and that others skilled in the art may construct modified embodiments without departing from the true spirit and scope of the invention.

What is claimed is:

1. In a telephone system including a subscriber line provided with a pair of line conductors and first and second control conductors, a source of power supply provided with a reference voltage terminal and a low voltage terminal and a high voltage terminal, a plurality of outgoing switches having access to the subcsriber line via said line conductors and said first control conductor, the application of said low potential to said first control conductor marking said subscriber line as calling and the application of said reference potential to said first control conductor marking said subscriber line as busy to said outgoing switches, any one of said outgoing switches seizing said subscriber line and impressing said reference potential upon said first control conductor as a holding potential, a plurality of incoming switches having access to said subscriber line via said line conductors and said second control conductor, the application of said low potential to said second control conductor marking said subscriber line as idle to said incoming switches and the application of said reference potential to said second control conductor marking said subscriber line as busy to said incoming switches, any one of said incoming switches seizing said subscriber line and impressing said reference potential upon said second control conductor as a holding potential, a start conductor, and means responsive to the application of said low potential upon said start conductor for operating one of said outgoing switches to seize said subscriber line; a line circuit associated with said subscriber line and comprising a line relay provided with first and second winding, a first supply connection via the first winding of said line relay from said low voltage terminal to one of said line conductors, a second supply connection via the second winding of said line relay from said reference voltage terminal to the other of said line conductors, a cut-off relay provided with a single winding, a first control resistor, a bus, a first transistor provided with a collector connected to said bus and an emitter connected via said first control resistor to said high voltage terminal and a base connected to said low voltage terminal, whereby said first transistor is rendered conductive and said low potential is applied to said bus, a connection via the winding of said cut-off relay from said second control conductor to said bus, whereby said low potential is applied to said second control conductor when said subscriber line is idle, means responsive to the initiation of a call upon said line conductors for completing a circuit via said first and second supply connections, whereby said line relay is operated, means responsive to the operation of the line relay for completing a connection via the winding of the cut-off relay from the first control conductor to said bus to apply said low potential to said first control conductor and for interrupting the connection from said second control conductor to said bus and for completing a connection from said second control conductor to the reference voltage terminal, further means responsive to the operation of said line relay for applying said low potential to said start conductor whereby one of said outgoing switches seizes said subscriber line, said cut-off relay being operated via said first control conductor responsive to said reference voltage impressed thereupon incident to the seizure of said subscriber line by any one of said outgoing switches, means responsive to the operation of the cut-off relay for completing a connection via the winding of said cut-off relay from said first control conductor to said bus and for interrupting said first and second supply connections so as to restore said line relay, said cut-off relay being operated via said second control conductor responsive to said reference potential impressed thereupon incident to the seizure of said subscriber line by any one of said incoming switches, a capacitor, a second control resistor, means responsive to the operation of said cut-off relay for completing a connection via said second control resistor and said capacitor from said reference voltage terminal to said bus so as to charge said capacitor, a shunt resistor connected in parallel with said second control resistor and said capacitor to discharge said capacitor when said cut-off relay is restored, a third control resistor, a second transistor provided with an emitter connected via said third control resistor to the junction of said first control resistor and the collector of said first transistor and a collector connected to said reference voltage terminal and a base, means responsive to the initiation of an immediate recall upon said line conductors for recompleting the circuit via said first and second supply connections, whereby said line relay is unoperated, and means responsive to the reoperation of said line relay for completing a connection from said reference voltage terminal to said bus and for completing a connection from the junction between said second control resistor and said capacitor to the base of said second transistor to render said second transistor conductive, whereby said first transistor is rendered nonconductive.

2. In a telephone system including a subscriber line provided with a pair of line conductors and first and second control conductors, a source of power supply provided with a reference voltage terminal and a low voltage terminal and a high voltage terminal, a plurality of outgoing switches having access to the subscriber line via said line conductors and said first control conductor, the application of said low potential to said first control conductor, marking said subscriber line as calling and the application of said reference potential to said first control conductor marking said subscriber line as busy to said outgoing switches, any one of said outgoing switches seizing said subscriber line and impressing said reference potential upon said first control conductor as a holding potential, a plurality of incoming switches having access to said subscriber line via said line conductors and said second control conductor, the application of said low potential to said second control conductor marking said subscriber line as idle to said incoming switches and the application of said reference potential to said second control conductor marking said subscriber line as busy to said incoming switches, any one of said incoming switches seizing said subscriber line and impressing said reference potential upon said second control conductor as a holding potential, a start conductor, and means responsive to the application of said low potential upon said start conductor for operating one of said outgoing switches to seize said subscriber line; a line circuit associated with said subscriber line and comprising a line relay provided with first and second winding, a first supply connection via the first winding of said line relay from said low voltage terminal to one of said line conductors, a second supply connection via the second winding of said line relay from said reference voltage terminal to the other of said line conductors, a cut-off relay provided with a single winding, a first control resistor, a bus, a first transistor provided with a collector connected to said bus and an emitter connected via said first control resistor to said high voltage terminal and a base connected to said low voltage terminal, whereby said first transistor is rendered conductive and low potential is applied to said bus, a connection via the winding of said cut-off relay from said second control conductor to said bus, whereby said low potential is applied to said second control conductor when said subscriber line is idle, means responsive to the initiation of a call upon said line conductors for completing a circuit via said first and second supply connections, whereby said line relay is operated, means responsive to the operation of the line relay for completing a connection via the winding of the cut-off relay from the first control conductor to said bus to apply said low potential to said first control conductor and for interrupting the connection from said second control conductor to said bus and for completing a connection from said second control conductor to the reference voltage terminal, further means responsive to the operation of said line relay for applying said low potential to said start conductor whereby one of said outgoing switches seizes said subscriber line, said cut-off relay being operated via said first control conductor responsive to said reference potential impressed thereupon incident to the seizure of said subscriber line by any one of said outgoing switches, means responsive to the operation of the cut-off relay for completing a connection via the winding of said cut-off relay from said first control conductor to said bus and for interrupting said first and second supply connections so as to restore said line relay.

3. The telephone system including the line circuit set forth in claim 2, and further comprising a diode, pulse counter apparatus, and a connection via said diode and said pulse counter apparatus from said first control conductor to said reference voltage terminal.

4. In a telephone system including a subscriber line provided with a pair of line conductors and first and second control conductors, a source of power supply provided with a reference voltage terminal and a low voltage terminal and a high voltage terminal, a plurality of outgoing switches having access to the subscriber line via said line conductors and said first control conductor, the application of said low potential to said first control conductor marking said subscriber line as calling and the application of said reference potential to said first control conductor marking said subscriber line as busy to said outgoing switches, any one of said outgoing switches seizing said subscriber line and impressing said reference potential upon said first control conductor as a holding potential, a plurality of incoming switches having access to said subscriber line via said line conductors and said second control conductor, the application of said low potential to said second control conductor marking said subscriber line as idle to said incoming switches and the application of said reference potential to said second control conductor marking said subscriber line as busy to said incoming switches, any one of said incoming switches seizing said subscriber line and impressing said reference potential upon said second control conductor as a holding potential, a start conductor, and means responsive to the application of said low potential upon said start conductor for operating one of said outgoing switches to seize said subscriber line; a line circuit associated with said subscriber line and comprising a line relay provided with first and second winding, a first supply connection via the first winding of said line relay from said low voltage terminal to one of said line conductors, a second supply connection via the second winding of said line relay from said reference voltage terminal to the other of said line conductors, a cut-off relay provided with a single winding, a first control resistor, a bus, a first transistor provided with a collector connected to said bus and an emitter connected via said first control resistor to said high voltage terminal and a base connected to said low voltage terminal, whereby said first transistor is rendered conductive and said low potential is applied to said bus, a connection via the winding of said cut-off relay from said second control conductor to said bus, whereby said low potential is applied to said second control conductor when said subscriber line is idle, means responsive to the initiation of a call upon said line conductors for completing a circuit via said first and second supply connections, whereby said line relay is operated, means responsive to the operation of the line relay for completing a connection via the winding of the cut-off relay from the first control conductor to said bus to apply said low potential to said first control conductor and for interrupting the connection from said second control conductor to said bus and for completing a connection from said second control conductor to the reference voltage terminal, further means responsive to the operation of said line relay for applying said low potential to said start conductor whereby one of said outgoing switches seizes said subscriber line, said cut-off relay being operated via said first control conductor responsive to said reference potential impressed thereupon incident to the seizure of said subscriber line by any one of said outgoing switches, means responsive to the operation of the cut-off relay for completing a connection via the winding of said cut-off relay from said first control conductor to said bus and for interrupting said first and second supply connections so as to restore said line relay, a capacitor, a second control resistor, means responsive to the operation of said cut-off relay for completing a connection via said second control resistor and said capacitor from said reference voltage terminal to said bus so as to charge said capacitor, a shunt resistor connected in parallel with said second control resistor and said capacitor to discharge said capacitor when said cut-off relay is restored, a third control resistor, a second transistor provided with an emitter connected via said third control resistor to the junction of said first control resistor and the collector of said first transistor and a collector connected to said reference voltage terminal and a base, means responsive to the initiation of an immediate recall upon said line conductors for recompleting the circuit via said first and second supply conductors, whereby said line relay is reoperated, and means responsive to the reoperation of said line relay for completing a connection from said reference voltage terminal to said bus and for completing a connection from the junction between said second control resistor and said capacitor to the base of said second transistor to render said second transistor conductive, whereby said first transistor is rendered nonconductive.

5. In a telephone system including a subscriber line provided with a pair of line conductors and first and second control conductors, a source of power supply provided with a reference voltage terminal and a low voltage terminal and a high voltage terminal, a plurality of outgoing switches having access to the subscriber line via said line conductors and said first control conductor, the application of said low potential to said first control conductor marking said subscriber line as calling and the application of said reference potential to said first control conductor marking said subscriber line as busy to said outgoing switches, any one of said outgoing switches seizing said subscriber line and impressing said reference potential upon said first control conductor as a holding potential, a plurality of incoming switches having access to said subscriber line via said line conductors and said second control conductor, the application of said low potential to said second control conductor marking said subscriber line as idle to said incoming switches and the application of said reference potential to said second control conductor marking said subscriber line as busy to said incoming switches, any one of said incoming switches seizing said subscriber line and impressing said reference potential upon said second control conductor as a holding potential, a start conductor, and means responsive to the application of said low potential upon said start conductor for operating one of said outgoing switches to seize said subscriber line; a line circuit associated with said subscriber line and comprising a line relay provided with first and second winding, a first supply connection via the first winding of said line relay from said low voltage terminal to one of said line conductors, a second supply connection via the second winding of said line relay from said reference voltage terminal to the other of said line conductors, a cut-off relay provided with a single winding, a first control resistor, a bus, a first transistor provided with a collector connected to said bus and an emitter connected via said first control resistor to said high voltage terminal and a base connected to said low voltage terminal, whereby said first transistor is rendered conductive and said low potential is applied to said bus, a connection via the winding of said cut-off relay from said second control conductor to said bus, whereby said low potential is applied to said second control conductor when said subscriber line is idle, said cut-off relay being operated via said second control conductor responsive to said reference potential impressed thereupon incident to the seizure of said subscriber line by any one of said incoming switches, and means responsive to the operation of said cut-off relay for interrupting said first and second supply connections.

6. In a telephone system including a subscriber line provided with a pair of line conductors and first and second control conductors, a source of power supply provided with a reference voltage terminal and a low voltage terminal and a high voltage terminal, a plurality of outgoing switches having access to the subscriber line via said line conductors and said first control conductor, the application of said low potential to said first control conductor marking said subscriber line as calling and the application of said reference potential to said first control conductor marking said subscriber line as busy to said outgoing switches, any one of said outgoing switches seizing said subscriber line and impressing said reference potential upon said first control conductor as a holding potential, a plurality of incoming switches having access to said subscriber line via said line conductors and said second control conductor, the application of said low potential to said second control conductor marking said subscriber line as idle to said incoming switches and the application of said reference potential to said second control conductor marking said subscriber line as busy to said incoming switches, any one of said incoming switches seizing said subscriber line and impressing said reference potential upon said second control conductor as a holding potential, a start conductor, and means responsive to the application of said low potential upon said start conductor for operating one of said outgoing switches to seize said subscriber line; a line circuit associated with said subscriber line and comprising a line relay provided with first and second winding, a first supply connection via the first winding of said line relay from said low voltage terminal to one of said line conductors, a second supply connection via the second winding of said line relay from said reference voltage terminal to the other of said line conductors, a cut-off relay provided with a single winding, a first control resistor, a bus, a first transistor provided with a collector connected to said bus, and an emitter connected via said first control resistor to said high voltage terminal and a base connected to said low voltage terminal, whereby said first transistor is rendered conductive and said low potential is applied to said bus, a connection via the winding of said cut-off relay from said second control conductor to said bus, whereby said low potential is applied to said second control conductor when said subscriber line is idle, said cut-off relay being operated via said second control conductor responsive to said reference potential impressed thereupon incident to the seizure of said subscriber line by any one of said incoming switches, means responsive to the operation of said cut-off relay for interrupting said first and second supply connections, a capacitor, a second control resistor, means responsive to the operation of said cut-off relay for completing a connection via said second control resistor and said capacitor from said reference voltage terminal to said bus so as to charge said capacitor, a shunt resistor connected in parallel with said second control resistor and said capacitor to discharge said capacitor when said cut-off relay is restored, a third control resistor, a second transistor provided with an emitter connected via said third control resistor to the junction of said first control resistor and the collector of said first transistor and a collector connected to said reference voltage terminal and a base, means responsive to the initiation of an immediate recall upon said line conductors for recompleting the circuit via said first and second supply connections, whereby said line relay is reoperated, and means responsive to the reoperation of said line relay for completing a connection from said reference voltage terminal to said bus and for completing a connection from the junction between said second control resistor and said capacitor to the base of said second transistor to render said second transistor conductive, whereby said first transistor is rendered nonconductive.

7. In a telephone system including a subscriber line provided with a pair of line conductors and first and second control conductors, a source of power supply provided with a reference voltage terminal and a low voltage terminal and a high voltage terminal, a plurality of outgoing switches having access to the subscriber line via said line conductors and said first control conductor, the application of said low potential to said first control conductor marking said subscriber line as calling and the application of said reference potential to said first control conductor marking said subscriber line as busy to said outgoing switches, any one of said outgoing switches seizing said subscriber line and impressing said reference potential upon said first control conductor as a holding potential, a plurality of incoming switches having access to said subscriber line via said line conductors and said second control conductor, the application of said low potential to said second control conductor marking said subscriber line as idle to said incoming switches and the application of said reference potential to said second control conductor marking said subscriber line as busy to said incoming switches, any one of said incoming switches seizing said subscriber line and impressing said reference potential upon said second control conductor as a holding potential, a start conductor, and means responsive to the application of said low potential upon said start conductor for operating one of said outgoing switches to seize said subscriber line; a line circuit associated with said subscriber line and comprising a line relay provided with first and second winding, a first supply connection via the first winding of said line relay from said low voltage terminal to one of said line conductors, a second supply connection via the second winding of said line relay from said reference voltage terminal to the other of said line conductors, a cut-off relay provided with a single winding, a first control resistor, a bus, a first transistor provided with a collector connected to said bus, and an emitter connected via said first control resistor to said high voltage terminal and a base connected to said low voltage terminal, whereby said first transistor is rendered conductive and said low potential is applied to said bus, a connection via the winding of said cut-off relay from said second control conductor to said bus, whereby said low potential is applied to said second control conductor when said subscriber line is idle, means responsive to the initiation of a call upon said line conductor for completing a circuit via said first and second supply connections, whereby said line relay is operated, a diode, means responsive to the operation of said line relay for completing a connection via the winding of said cut-off relay from the first control conductor to said bus to apply said low potential to said first control terminal and for interrupting the connection from said second control conductor to said bus and for completing a connection from said second control conductor to said reference voltage terminal and for completing a connection via said diode from said bus to said start conductor whereby one of said outgoing switches seizes said subscriber line, said cut-off relay being operated via said first control conductor responsive to said reference voltage impressed thereupon incident to the seizure of said subscriber line by any one of said outgoing switches, means responsive to the operation of the cut-off relay for completing a connection via the winding of said cut-off relay from said first control conductor to said bus and for interrupting said first and second supply connections so as to restore said line relay.

8. In a telephone system including a subscriber line provided with a pair of line conductors and first and second control conductors, a source of power supply provided with a reference voltage terminal and a low voltage terminal and a high voltage terminal, a plurality of outgoing switches having access to the subscriber line via said line conductors and said first control conductor, the application of said low potential to said first control conductor marking said subscriber line as calling and the application of said reference potential to said first control conductor marking said subscriber line as busy to said outgoing switches, any one of said outgoing switches seizing said subscriber line and impressing said reference potential upon said first control conductor as a holding potential, a plurality of incoming switches having access to said subscriber line via said line conductors and said second control conductor, the application of said low potential to said second control conductor marking said subscriber line as idle to said incoming switches and the application of said reference potential to said second control conductor marking said subscriber line as busy to said incoming switches, any one of said incoming switches seizing said subcriber line and impressing said reference potential upon said second control conductor as a holding potential, a start conductor, and means responsive to the application of said low potential upon said start conductor for operating one of said outgoing switches to seize said subscriber line; a line circuit associated with said subscriber line and comprising a line relay provided with first and second winding, a first supply connection via the first winding of said line relay from said low voltage terminal to one of said line conductors, a second supply connection via the second winding of said line relay from said reference voltage terminal to the other of said line conductors, a cut-off relay provided with a single winding, a first control resistor, a bus, a first transistor provided with a collector connected to said bus and an emitter connected via said first control resistor to said high voltage terminal and a base connected to said low voltage terminal, whereby said first transistor is rendered conductive and said low potential is applied to said bus, a connection via the winding of said cut-off relay from said second control conductor to said bus, whereby said low potential is applied to said second control conductor when said subscriber line is idle, a diode, a load resistor, a connection via said diode and said load resistor from said start conductor to the reference voltage terminal, means responsive to the initiation of a call upon said line conductors for completing a circuit via said first and second supply connections, whereby said line relay is operated, means responsive to the operation of the line relay for completing a connection via the winding of the cut-off relay from the first control conductor to said bus to apply said low potential to said first control conductor and for interrupting the connection from said second control conductor to said bus and for completing a connection from said second control conductor to the reference voltage terminal and for completing a connection from said bus to the junction between said diode and said control resistor whereby said low potential is applied to the start conductor and one of said outgoing switches is caused to seize said subscriber line, said cut-off relay being operated via said first control conductor responsive to said reference potential impressed thereupon incident to the seizure of said subscriber line by said outgoing switch, means responsive to the operation of the cut-off relay for completing a connection via the winding of said cut-off relay from said first control conductor to said bus and for interrupting said first and second supply connections so as to restore said line relay, a capacitor, a second control resistor, means responsive to the operation of said cut-off relay for completing a connection via said second control resistor and said capacitor from said reference voltage terminal to said bus so as to charge said capacitor, a shunt resistor connected in parallel with said second control resistor and said capacitor to discharge said capacitor when said cut-off relay is restored, a third control resistor, a second transistor provided with an emitter connected via said third control resistor to the junction of said first control resistor and the collector of said first transistor and a collector connected to said reference voltage terminal and a base, means responsive to the initiation of an immediate recall upon said line conductor for recompleting the circuit via said first and second supply connections, whereby said line relay is reoperated, and means responsive to the reoperation of said line relay for completing a connection from the junction between said second control resistor and said capacitor to the base of said second transistor to render said second transistor conductive, whereby said first transistor is rendered nonconductive and said reference potential is impressed upon said bus.

9. In a telephone system including a subscriber line, and switching apparatus having access to said subscriber line; the combination comprising a line circuit including a line relay connected to said subscriber line and operated responsive to the initiation of a call on the subscriber line in order to cause said subscriber line to be marked as calling to said switching apparatus and to cause said switching apparatus to be operated for completing a connection to said calling subscriber line, a cut-off relay operated and restored respectively responsive to the completion and to the release of the connection between said subscriber line and said switching apparatus, said operated cut-off relay interrupting the connection between said line relay and said subscriber line, whereby said line relay is restored, said restored cut-off relay recompleting the connection between said line relay and said subscriber line, a biasing network operative into a first condition responsive to the operation of said line relay and operative into a second condition responsive to the operation of said cut-off relay wherein said second operating condition is sustained during the period of operation of said cut-off relay and for a predetermined period after said cut-off relay is restored and operative from said second condition into a third condition responsive to the operation of said line relay within said predetermined period after said cut-off relay is restored, and a transistor network operatively connected to said biasing network and responsive to said first biasing condition for marking said subscriber line as calling to said switching apparatus and for initiating operation of said switching apparatus and for preparing said cut-off relay for operation and responsive to said second biasing condition for maintaining said cut-off relay operated during the interval said subscriber line is connected to said switching apparatus and responsive to said third operating condition for marking said subscriber line as busy to said switching apparatus.

10. In a telephone system including a subscriber line provided with a pair of line conductors and a control conductor, and switching apparatus having access to said subscriber line; the combination comprising a line circuit including a line relay connected to the pair of line conductors of said subscriber line and operated responsive to the initiation of a call on said subscriber line in order to cause a marking potential to be applied to the control conductor thereof, whereby said switching apparatus completes a connection to said calling subscriber line, a cut-off relay operated and restored respectively responsive to the completion and to the release of the connection between said subscriber line and said switching apparatus, said operated cut-off relay interrupting the connection between said line relay and the pair of line conductors of said subscriber line, whereby said line relay is restored, said restored cut-off relay recompleting the connection between said line relay and the pair of line conductors of said subscriber line, a biasing network operative into a first condition responsive to the operation of said line relay and operative into a second condition responsive to the operation of said cut-off relay wherein said second operating condition is sustained during the period of operation of said cut-off relay and for a predetermined period after said cut-off relay is restored and operative from said second condition into a third condition responsive to the operation of said line relay within said predetermined period after the said cut-off relay is restored, and a transistor network operatively connected to said biasing network and responsive to said first biasing condition for applying said marking potential to the control conductor of said subscriber line and for preparing said cut-off relay for operation and responsive to said second biasing condition for maintaining said cut-off relay operated during the interval said subscriber line is connected to said switching apparatus and responsive to said third operating condition for preventing the application of said marking potential to the control conductor of said subscriber line.

11. The telephone system set forth in claim 10, wherein said transistor network consists essentially of a first transistor and a second transistor connected in a lockout circuit whereof said first transistor is rendered conductive responsive to the first and second and third biasing conditions of said biasing network and is prevented from conducting responsive conduction of said second transistor and whereof said second transistor is conductive responsive to the third biasing condition of said biasing network, whereby said first transistor is conductive responsive only to said first and second biasing conditions.

12. In a telephone system including a subscriber line provided with a pair of line conductors and first and second control conductors, a source of power supply provided with a reference voltage terminal and a low voltage terminal and a high voltage terminal, a plurality of outgoing switches having access to the subscriber line via said line conductors and said first control conductor, the application of said low potential to said first control conductor marking said subscriber line as calling and the application of said reference potential to said first control conductor marking said subscriber line as busy to said outgoing switches, any one of said outgoing switches seizing said subscriber line and impressing said reference potential upon said first control conductor as a holding potential, a plurality of incoming switches having access to said subscriber line via said line conductors and said second control conductor, the application of said low potential to said second control conductor marking said subscriber line as idle to said incoming switches and the application of said reference potential to said second control conductor marking said subscriber line as busy to said incoming switches, any one of said incoming switches seizing said subscriber line and impressing said reference potential upon said second control conductor as a holding potential, a start conductor, and means responsive to the application of said low potential upon said start conductor for operating one of said outgoing switches to seize said subscriber line; a line circuit associated with said subscriber line and comprising a line relay connected to said pair of line conductors and operated responsive to the initiation of a call on said subscriber line for applying said low potential to said first control conductor and for applying said high potential to said start conductor and for applying said reference potential to said second control conductor, whereby one of said outgoing switches is caused to seize said subscriber line, means including a cutoff relay responsive to the seizure of said subscriber line for interrupting the connection between said line relay and said pair of line conductors, whereby said operated line relay is restored, and responsive to the release of said seized subscriber line for recompleting a connection between said line circuit and said pair of line conductors, and a transistor lockout circuit responsive to the operation of said line relay within a predetermined period after the release of said seized subscriber line for applying said reference potential to said first control conductor and to said second control conductor and to said start conductor.

13. In a telephone system including a line circuit as set forth in claim 12, wherein said transistor lock-out circuit includes a first normally conductive transistor and a second normally nonconductive transistor and means responsive to the operation of said line relay within a predetermined period after the release of said seized subscriber line for rendering said first transistor nonconductive and for rendering said second transistor conductive.

References Cited in the file of this patent

UNITED STATES PATENTS

| | | |
|---|---|---|
| 2,572,027 | Horwitz | Oct. 23, 1951 |
| 2,715,656 | Andrews | Aug. 16, 1955 |
| 2,731,514 | Oberman | Jan. 17, 1956 |